United States Patent
Petev et al.

(10) Patent No.: US 8,028,002 B2
(45) Date of Patent: Sep. 27, 2011

(54) NAMING SERVICE IMPLEMENTATION IN A CLUSTERED ENVIRONMENT

(75) Inventors: Petio Petev, Sofia (BG); Elitsa Pancheva, Sofia (BG)

(73) Assignee: SAP AG, Walldorf (DE)

( * ) Notice: Subject to any disclaimer, the term of this patent is extended or adjusted under 35 U.S.C. 154(b) by 1266 days.

(21) Appl. No.: 10/856,053

(22) Filed: May 27, 2004

(65) Prior Publication Data

US 2005/0278332 A1 Dec. 15, 2005

(51) Int. Cl.
*G06F 7/00* (2006.01)
(52) U.S. Cl. .......................... 707/803; 707/792; 711/117
(58) Field of Classification Search .................. 707/803, 707/792; 711/117
See application file for complete search history.

(56) References Cited

U.S. PATENT DOCUMENTS

| | | | |
|---|---|---|---|
| 5,577,252 A | 11/1996 | Nelson et al. | |
| 5,706,501 A * | 1/1998 | Horikiri et al. | 707/10 |
| 5,745,683 A | 4/1998 | Lee et al. | |
| 6,154,777 A | 11/2000 | Ebrahim | |
| 6,236,999 B1 | 5/2001 | Jacobs et al. | |
| 6,363,421 B2 | 3/2002 | Barker et al. | |
| 6,389,451 B1 | 5/2002 | Hart | |
| 6,466,570 B1 | 10/2002 | Low et al. | |
| 6,553,384 B1 * | 4/2003 | Frey et al. | 707/103 R |
| 6,711,682 B1 | 3/2004 | Capps | |
| 6,721,747 B2 * | 4/2004 | Lipkin | 707/10 |
| 6,751,646 B1 * | 6/2004 | Chow et al. | 718/105 |
| 6,834,284 B2 | 12/2004 | Acker et al. | |
| 6,836,462 B1 | 12/2004 | Albert et al. | |
| 6,850,893 B2 * | 2/2005 | Lipkin et al. | 705/8 |
| 7,058,639 B1 * | 6/2006 | Chatterjee et al. | 707/100 |
| 7,308,475 B1 | 12/2007 | Pruitt et al. | |
| 2002/0188657 A1 | 12/2002 | Traversat et al. | |
| 2003/0028585 A1 | 2/2003 | Yeager et al. | |
| 2003/0195870 A1 | 10/2003 | Newcombe et al. | |
| 2004/0220926 A1 * | 11/2004 | Lamkin et al. | 707/3 |
| 2005/0270973 A1 | 12/2005 | Raev et al. | |

OTHER PUBLICATIONS

Sun Microsystems, Inc., *JNDI: Java Naming and Directory Interface*, Java Naming and Directory; Jan. 29, 1998, pp. ii-63, Palo Alto, California.
Sun Microsystems, Inc., *JNDI SPI: Java Naming and Directory Service Provider Interface*, Java Naming and Directory SPI, Jan. 29, 1998, pp. ii-43.
Frey, Gregory K., Final Office Action, dated May 15, 2007, U.S. Appl. No. 10/836,851, filed Apr. 30, 2004, 15 pgs.
Frey, Gregory K., Non-Final Office Action, dated Dec. 12, 2006, U.S. Appl. No. 10/836,851, filed Apr. 30, 2004, 10 pgs.
Frey, Gregory K., Non-Final Office Action, dated Oct. 26, 2007, U.S. Appl. No. 10/836,851, filed Apr. 30, 2004, 11 pgs.
Mockapetris, P, "Domain Name—Implementation and Specification", RFC 1035, Nov. 1987, IETF, pp. 1-56.
Perrone, et al., "Build Java System with J2EE", Chapter 19, Naming Services, Jun. 2000, published by Sams, pp. 1-27.
Petev, Petio, et al., Non-Final Office Action, dated Aug. 10, 2007, U.S. Appl. No. 10/856,051, filed May 27, 2004, 17 pgs.
Petev, Petio, et al., Non-Final Office Action, dated Jan. 24, 2008, U.S. Appl. No. 10/856,051, filed May 27, 2004, 15 pgs.
Petev, Petio, et al., Non-Final Office Action dated Dec. 12, 2007, U.S. Appl. No. 10/856,047, filed May 27, 2004, 21 pgs.
Petev, Petio, et al., Final Office Action dated Jun. 26, 2008, U.S. Appl. No. 10/856,047, filed May 27, 2004, 23 pgs.
Non-Final Office Action dated Oct. 16, 2008, U.S. Appl. No. 10/856,051, filed May 27, 2004, whole document.

* cited by examiner

*Primary Examiner* — John E Breene
*Assistant Examiner* — Christopher J Raab

(57) ABSTRACT

A method and system for providing naming operations. Contexts are created and organized hierarchically under an initial context. The hierarchy is retained in a non-persistent storage medium. The objects and contexts created as a result of various naming operations are removed from the naming system responsive to a reboot of a server. In one embodiment, the entire naming hierarchy is represented in nested hash tables with a nesting level of only two.

20 Claims, 7 Drawing Sheets

Naming tree:

Database representation:

NAMING SERVICE IMPLEMENTATION IN A CLUSTERED ENVIRONMENT

BACKGROUND

1. Field of the Invention

Embodiments of the invention relate to naming. More specifically, embodiments of the invention relate to naming systems in which naming operations are performed locally with the results stored in non-persistent memory.

2. Background

Naming service broadly refers to the mechanism by which an object is associated with a name and by which objects may be found given their names. Each name is generated by a set of syntactic rules called, "naming convention". An atomic name is an indivisible component of a name as defined by the naming convention. The association of the atomic name with an object is called, "binding." Some objects cannot be stored directly so they are put in the system as references. A "reference" is an object, which contains one or some addresses of objects which themselves are not directly bound to the naming system. Every name is interpreted relative to some context, and every naming operation is performed in a context object. A "context" is a set of bindings in which names are relative to a certain naming convention. A client may obtain an initial context object that provides a starting point for resolution of names in the naming system. Every naming system consists of contexts of a certain type (one and the same naming convention) that provide the same identical set of operations. Every operation is relative to a certain namespace. A "namespace" is the set of names in the naming system. The naming service organization of the namespace is a treelike structure of naming context objects that can be traversed to locate a particular name.

A directory service is a naming service that allows each bound object to be associated with attributes and provides a way to retrieve an object by looking up some of its attributes rather than its name (search). The "attributes" are object characteristics. Both the attributes and the object itself form a directory object. A "directory" is a linked set of directory objects.

In a Java context, basic support for the naming and directory service is provided by a Java Naming and Directory Interface (JNDI) such as specified in *JNDI: Java Naming and Directory Interface*, Version 1.2, published by Sun Microsystems of Mountain View, Calif. and subsequent revisions thereof (the JNDI Specification). The JNDI Specification meets the system requirements of Java 2 Enterprise Edition (J2EE). These requirements are defined in the Java 2 Enterprise Edition Specification 1.3, published Jul. 27, 2001 or subsequent versions thereof (the J2EE Standard). JNDI is defined to be independent of any specific directory service implementation. This permits a variety of directories to be accessed in a common way.

Various naming services use a database management system (DBMS) service to store data resulting from naming operations. The storage within the database insures persistency of the naming operations in the event that the node goes down. One such example is depicted in FIG. 1. FIG. 1 is a diagram of a portion of naming tree and corresponding database representation used in one existing JNDI compatible naming service. The naming tree 100 shows the objects and contexts maintained in the database representation 120. As previously noted, the data is stored and managed in a database by the DBMS service. In this database representation 120, all contexts are represented as hierarchical structures of containers. As represented, the root container 102 contains the object1 container 104 and in the subcontext1 container 106. The subcontext1 container 106 contains object2 container 108 and the subcontext2 container 110. In this example, the only way to read the data 112 corresponding to object2 is by traversing through the root container 102 and then through the subcontext1 container 106 and then through the object2 container 108. In this example, since a single name space is used system wide, each naming operation must use a unique name for every object. These traversals and the required interaction with the DBMS service slow the performance of the naming service. Moreover, the stability of the naming service then also depends on the stability of the DBMS service.

SUMMARY

A method, apparatus and system to implement a naming service are disclosed. A server node and a non-persistent storage unit are provided. A hierarchical naming structure is stored in the non-persistent storage during operation. When the server is rebooted, the hierarchical naming structure is removed from the non-persistent storage.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Embodiments of the invention include a system and method of providing many operations in a clustered environment. The results of naming operations are retained in a non-persistent memory local to the creating server. Responsive to the reboot of the server all preexisting naming relationships are removed from the naming system. By using local memory, the speed of naming operations increases relative to the speed of operations in other existing naming services with persistent data storage.

Figure 2:
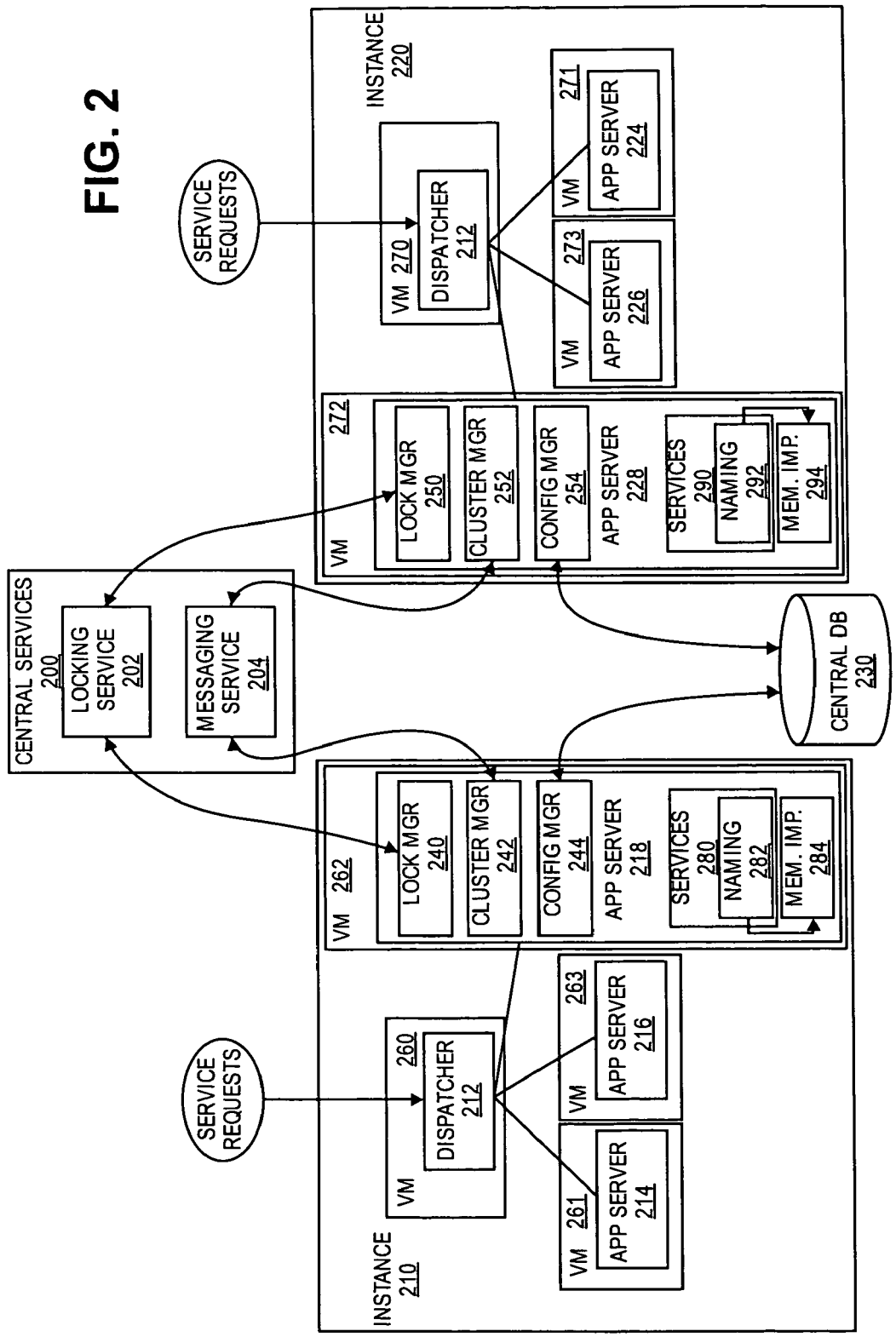
FIG. 2 is a block diagram of an application server architecture employing in one embodiment of the invention.

FIG. 2 is a block diagram of an application server architecture employed in one embodiment of the invention. The architecture includes central services "instance" 200 and a plurality of application server "instances" 210, 220. As used herein, application server instances, 210 and 220, each include a group of server nodes 214, 216, 218 and 224, 226, 228, respectively, and a dispatcher, 212, 222, respectively. Each application server node 214, 216, 218 and 224, 226, 228 and each dispatcher is resident in a virtual machine (VM) 260-263, 270-273. In one embodiment, the VM may be a Java Virtual Machine (JVM). Central services instance 200 includes locking service 202 and messaging service 204 (described below). The combination of all of the application instances 210, 220 and central services instance 200 is referred to herein as a "cluster." Although the following description focuses primarily on instance 210 for the purpose of explanation, the same principles apply to other instances such as instance 220.

Server nodes 214, 216, 218 within instance 210 provide the business and/or presentation logic for the network applications supported by the system. Each application server, for example 218 and 228, provides a set of core services 280, 290 to the business and/or presentation logic. Among the services provided is naming service 282, 292. In one embodiment, the naming service 282, 292 stores data and objects resulting from naming operations, referred to collectively as "naming data", in the memory implementation 284, 294 of its respective virtual machine 262, 272. The memory implementation 284, 294 by its nature is non-persistent. As a result, when a server goes down and reboots the naming data is not retained. Accordingly, on reboot, the server is assured of a clear name space. Moreover, because the naming operations are not reliant on a DBMS, efficiency and reliability of the naming service is improved.

Each of the server nodes 214, 216, 218 within a particular instance 210 may be configured with a redundant set of application logic and associated data. In one embodiment, dispatcher 212 distributes service requests from clients to one or more of server nodes 214, 216, 218 based on the load on each of the servers. For example, in one embodiment, a dispatcher implements a round-robin policy of distributing service requests (although various alternate load-balancing techniques may be employed). In one embodiment, the dispatcher performs load balancing on naming service requests from remote clients. However, once a remote client has received an initial context from a certain server node, the subsequent naming requests from that client are directed to the same server node.

In one embodiment of the invention, server nodes 214, 216, 218 are Java 2 Platform, Enterprise Edition ("J2EE") server nodes which support Enterprise Java Bean ("EJB") components and EJB containers (at the business layer) and Servlets and Java Server Pages ("JSP") (at the presentation layer). A J2EE platform complies with the J2EE Standard. In one embodiment, the naming service is compliant with the JNDI Specification. Of course, certain aspects of the embodiment of the invention described herein may be implemented in the context of other software platforms including, by way of example, Microsoft .NET platforms and/or the Advanced Business Application Programming ("ABAP") platforms developed by SAP AG, the assignee of the present application. Microsoft Net Platforms implement the Active Directory Service Interfaces (ADSI) such as Active Directory Service Interfaces Version 2.5 published by Microsoft Corporation of Redlands, Wash. or other versions thereof (the ADSI Standard). Thus, in the context of a .Net platform, the naming service would be compliant with the ADSI Standard.

In one embodiment, communication and synchronization between each of instances 210 and 220 is enabled via central services instance 200. As illustrated in FIG. 2, central services instance 200 includes messaging service 204 and locking service 202. Message service 204 allows each of the servers within each of the instances to communicate with one another via a message passing protocol. For example, messages from one server may be broadcast to all other servers within the cluster via messaging service 204. In addition, messages may be addressed directly to specific servers within the cluster (e.g., rather than being broadcast to all servers).

In one embodiment, locking service 202 disables access to (i.e., locks) certain specified portions of program code and/or configuration data stored within a central database 230. Locking managers 240 and 250 employed within the server nodes lock data on behalf of various system components which need to synchronize access to specific types of data and program code (e.g., such as the configuration managers 244 and 254).

In one embodiment, messaging service 204 and locking service 202 are each implemented on dedicated servers. However, messaging service 204 and the locking service 202 may be implemented on a single server or across multiple servers while still complying with the underlying principles of embodiments of the invention.

As illustrated in FIG. 2, each server node (e.g., 218, 228) includes a lock manager 240, 250 for communicating with locking service 202; a cluster manager 242, 252 for communicating with messaging service 204; and a configuration manager 244, 254 for communicating with central database 230 (e.g., to store/retrieve configuration data). Although lock managers 240 and 250, cluster managers 242 and 252, and configuration managers 244 and 254 are illustrated with respect to particular server nodes, 218 and 228, in FIG. 2, each of the server nodes 214, 216, 224 and 226 and/or on the dispatchers 212, 222 may be equipped with equivalent lock managers, cluster managers, configuration managers, and services.

Figures 3A, 3B:
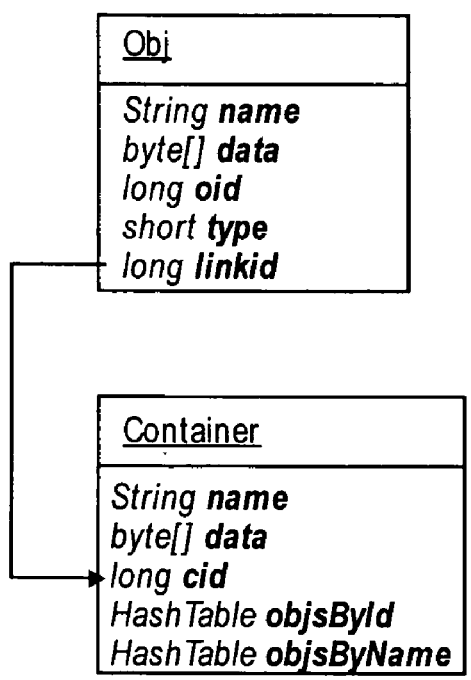
FIG. 3A is a diagrammatic representation of a first object type in one embodiment of the invention.
FIG. 3B is a diagrammatic representation of a context in one embodiment of the invention.

FIG. 3A is a diagrammatic representation of a first object type in one embodiment of the invention. The first object type is also referred to as an "Obj object" or "basic object." Basic object is used herein to draw a distinction from "container object," but does not imply special characteristics and could be used interchangeably with "object". The first object type includes a string which is the name of the object. The name of the object is the atomic name for that object. The first object type also includes data in the form of a byte array. The byte array is a serialized directory object. A directory object includes attributes of the object, the object itself and the class name of the object. The basic object also includes a long variable used as the object identifier (ID) for the object. A short variable is used for the type of operation as a result of which the object was created. For example, the object may be created by a local operation or a global operation. Where the object is created by a global operation, it will be necessary to replicate the object to other virtual machines within a system. This operation is discussed below with reference to FIG. 5. Finally, a long variable is used as the link ID of the object. The link identifier is discussed in more detail below with reference to FIG. 3B. In one embodiment of the invention, bound objects in the naming system are represented by Obj or basic objects.

FIG. 3B is a diagrammatic representation of a context in one embodiment of the invention. A context in the naming system is represented by a basic object with a container object linked to it. The basic object has the form discussed above with reference to FIG. 3A. A container object has a name which is a string that is the whole path from the root context to the context represented by the container. The container data is a byte array of serialized attributes of the context. The container ID of type long is equal to the link ID of the basic object. The container object also contains two hash tables: a hash table of objects within the container by name and a hash table of objects within the container by ID. These hash tables facilitate rapid retrieval of objects within the container responsive to either requests by name or ID.

As noted above, where the basic object forms part of a context, the link identifier is equal to the container identifier of the container object, which the basic object is linked to form the context. However, where the object is merely a basic object not forming a context, the link identifier is selected to be a value that cannot be a container identifier. In one embodiment of the invention, the link identifier for all objects not forming a context is negative one (−1).

Figure 1:
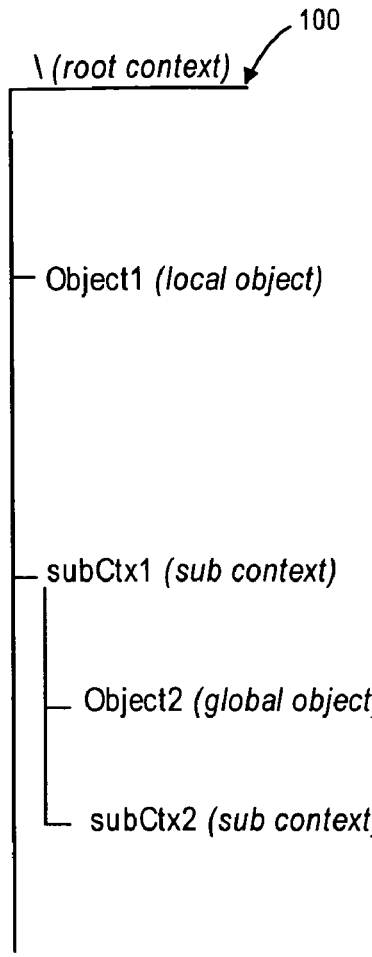
FIG. 1 is a diagram of a portion of a naming tree and corresponding database representation used in one existing JNDI compatible naming service.
Figure 1:
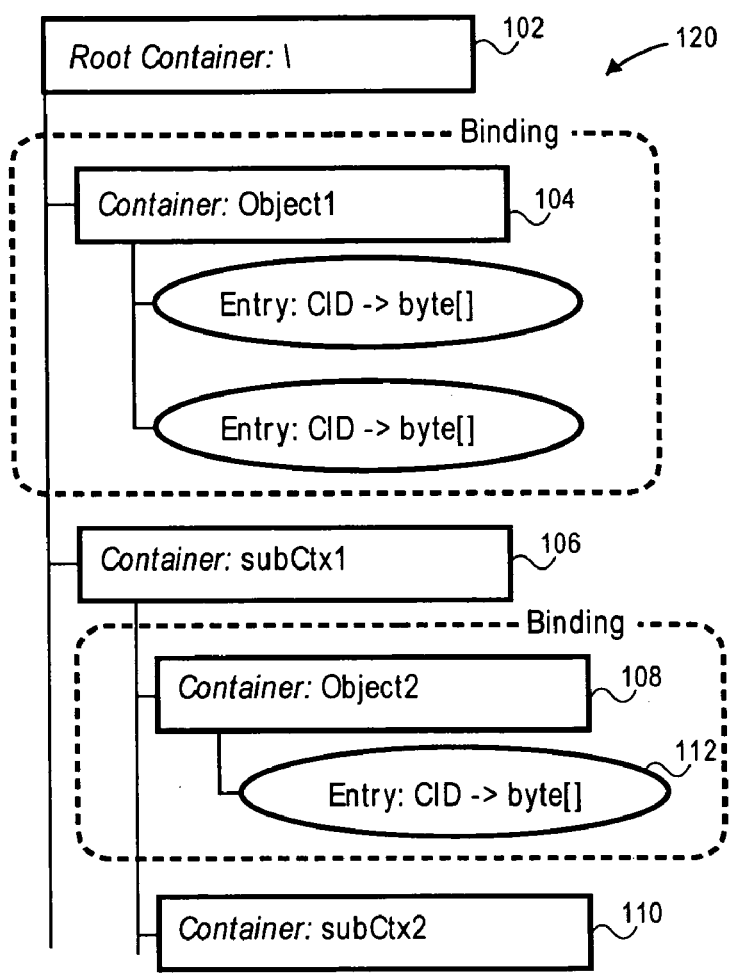
Figure 4A:
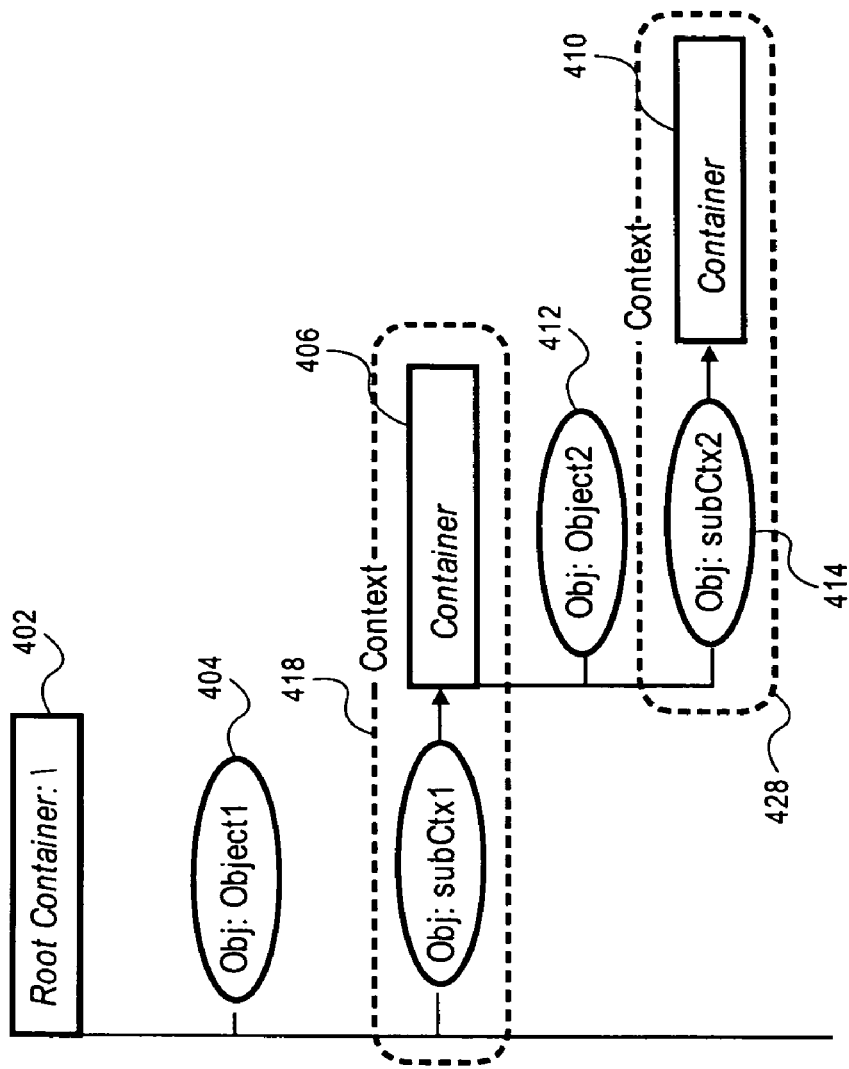
FIG. 4A is a diagram of a portion of a naming tree and corresponding memory representation of one embodiment of the invention.
Figure 4A:
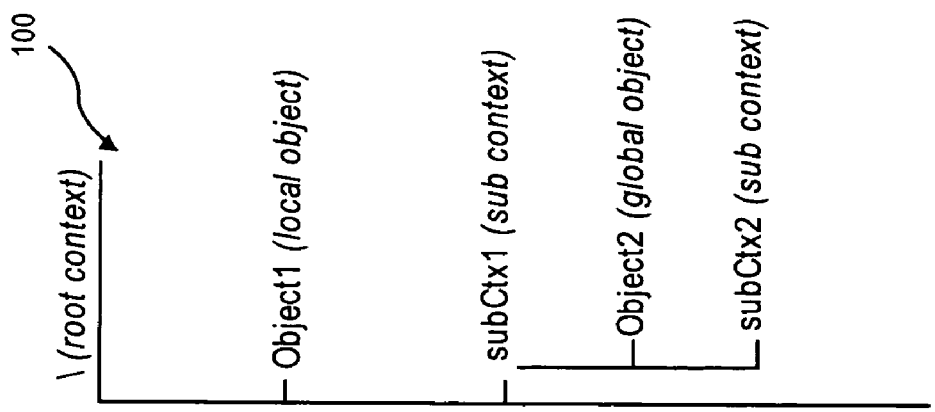

FIG. 4A is a diagram of a portion of a naming tree and corresponding memory representation of one embodiment of the invention. The same portion of naming tree 100 as depicted in FIG. 1 is used for illustration. This portion of the naming tree is represented by a root container 402 containing a basic object Obj: Object1 404 and a context 418. Context 418 includes basic object Obj: subCtx1 linked to container 406. Container 406 contains basic object Obj: object2 412 and context 428. Context 428 is formed from basic object Obj: subCtx2 414 linked to container 410. Referring back to the definition of basic object with reference to FIG. 3A the short variable of type for object 404 would be set to a value indicating type "local," while the short variable for type of object 412 would be set to a value indicating type "global." Thus, object 412 would be replicated to other servers in a cluster, but object 404 would not.

Figure 4B:
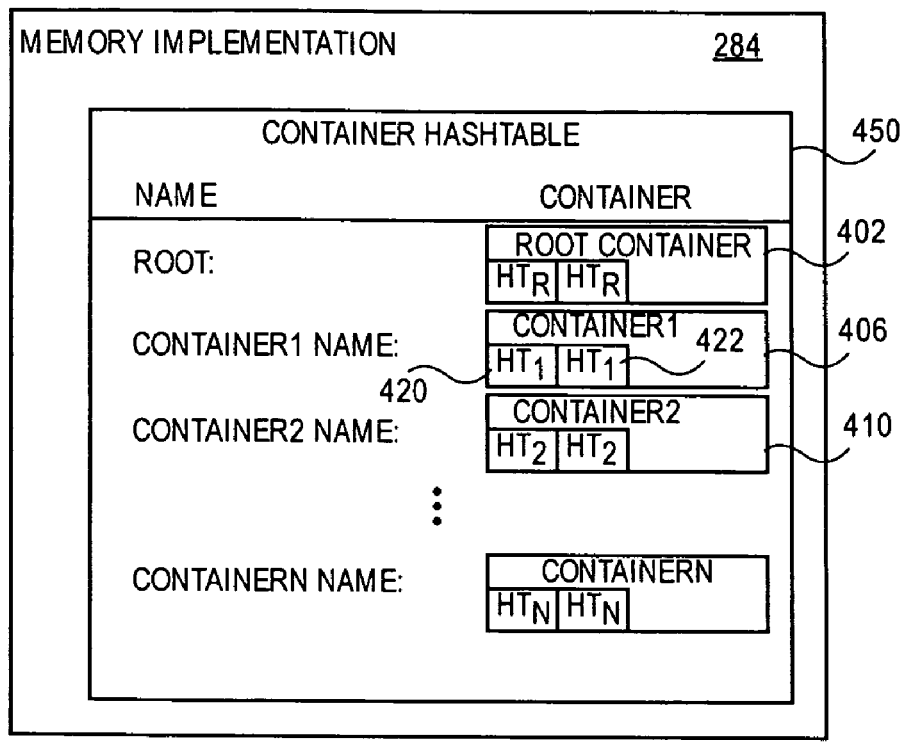
FIG. 4B is a diagram of how the memory representation may be stored in a memory implementation of a virtual machine in one embodiment of the invention.

FIG. 4B is a diagram of how the memory representation may be stored in a memory implementation of a virtual machine in one embodiment of the invention. In one embodiment, container hash table 450 is retained in, for example, memory implementation 284 as a hash table of container names to container objects. Thus, if the container name is known it is possible to navigate to any container no matter how deep within the memory hierarchy directly. Thus, referring to memory representation of FIG. 4A, the root container 402 is maintained against the name "root." The root container is the equivalent of the root context object; the initial container, which contains all other sub contexts and objects. It is created in the start of the naming service and cannot be accessed directly. Container1 406 is maintained against its name. Container2 410 is maintained against container2's name and so forth. Referring to FIG. 4A the name of the Container1 would be "subCtx1" and the name of the Container2 "subCtx1/SubCtx2". Each container includes one or more hash tables of the objects within the container. That is the objects bound in the context represented by this container and the sub contexts created under this context are retained in the hash table. In one embodiment, both the objects and the sub contexts are represented by "basic objects", the difference between sub contexts and the objects is that the link identifier in case of an object is −1 and in case of sub context is the ID of a container. As discussed above, in one embodiment, each container holds a hash table of objects against names and a hash table of objects against IDs. Thus, hash table 420 and hash table 422 are nested within container hash table 450. In other embodiments, one of those hash tables may be omitted.

Figure 4C:
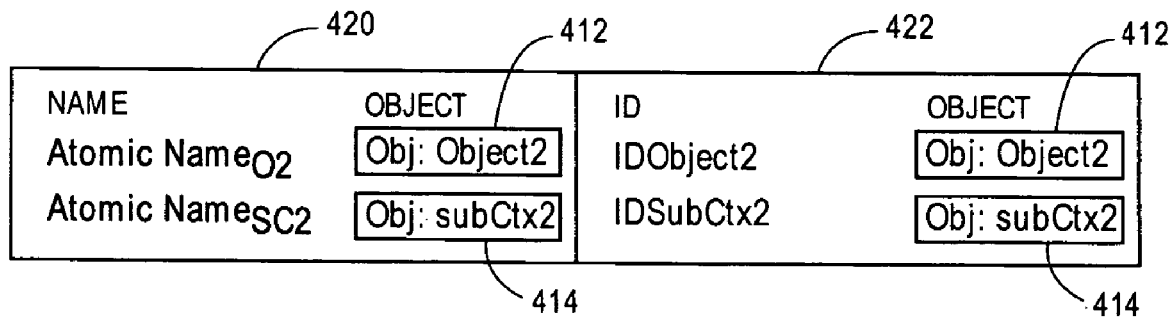
FIG. 4C is a diagram of a possible representation of the nested hash tables in one embodiment of the invention.

FIG. 4C is a diagram of a possible representation of the nested hash tables in one embodiment of the invention. Hash table 420 is a hash table of object name against the object, while hash table 422 is a hash table of the object ID against the object. The depth of the nesting need not exceed two, because all containers are accessible in the first layer and all objects under a container are accessible at the next layer. This limited depth of nested hash tables facilitates efficient naming operations and reduces the number of traversals within the hierarchy that must be performed to access an object.

Figure 5:
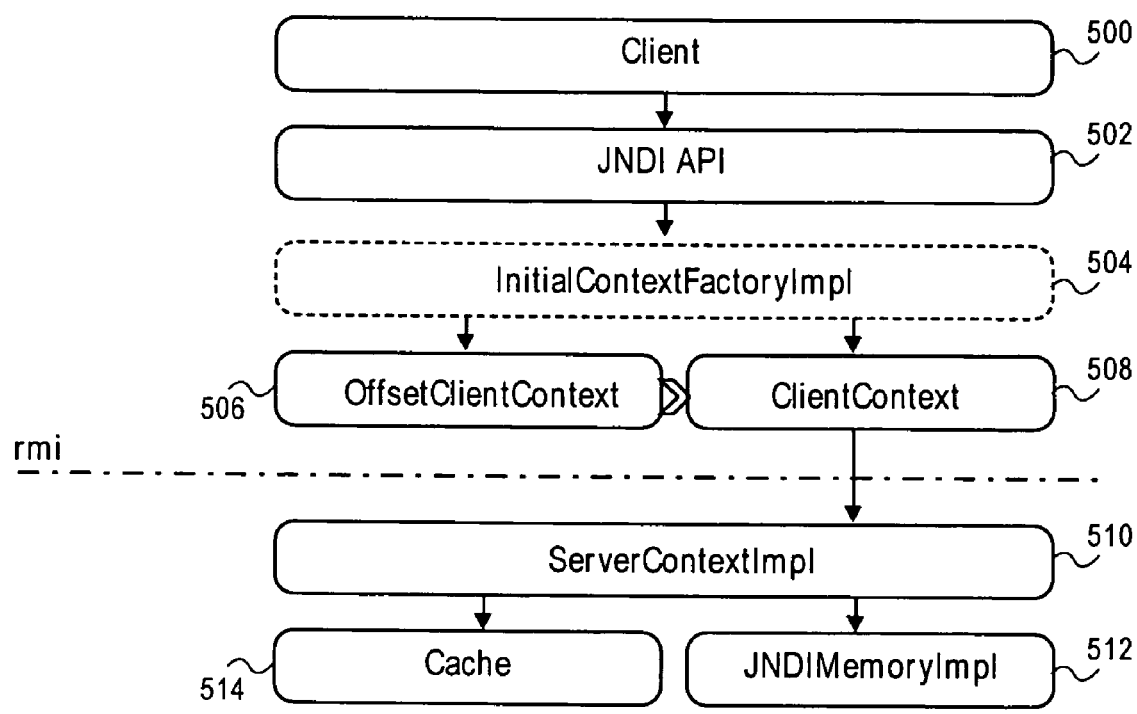
FIG. 5 is a diagram of layers in the naming system architecture in one embodiment of the invention.

FIG. 5 is a diagram of layers in the naming system architecture in one embodiment of the invention. A client source 500 uses a JNDI application programming interface (API) to request an initial context object. The client may be a local client, such as an application running within the same virtual machine as a naming service or may be a remote client defined as any client as not within the same virtual machine as the naming service.

At start up of the naming service, an initial context factory builder is established as a default factory builder in the javax.naming.spi.NamingManager such that a JNDI Application Programming Interface (API) 502 will access the initial context factory builder implementation when an initial context is requested by a client 500. The initial context factory builder will provide a proper initial context factory implementation 504 depending on the environment properties supplied by the client. The initial context of factory implementation 504 will return either offset client context 506 or client context 508 depending on the properties of the environment. Client Context always returns the root context, which is an abstraction that forms a starting point for all subsequent naming operations. The returned context may then be organized under the root context or any subcontext within the naming tree dependent on the rights of the client. In one embodiment, only applications will be provided an instance of offset client context 506. Offset client context 506 is an extension of client context 508 and indicates that the context is other than the root context. This prevents application from accessing or creating objects higher up the naming tree. Applications are allowed to perform naming operations only in their own namespace, e.g., the context returned as initial context and the subcontexts created under it.

Client context 508 has an instance of server context interface which will be either server context implementation 510, if a client is local or a stub to the server context implementation if the client is remote. Remote clients may use Remote Method Innovation (RMI) to pass messages to the server context implementation. Local client can communicate directly without using RMI.

Server context implementation 510 is connected to the JNDI memory implementation 512, which functions as the naming repository in one embodiment of the invention. Also, in some embodiments of the invention, server context implementation 510 may be connected to a naming cache 514. Naming cache 514 may be used to increase the speed of lookup operations in the naming system. In one embodiment, the naming cache 514 holds object instances for application clients running on the server and byte arrays of the objects for all other clients.

In one embodiment, the naming cache includes two concurrent hash tables and a cache communicator. A first hash table keeps every cached object as byte array and name. Elements are added in this hash table any time a client performs a lookup operation. The second hash table keeps every cached object as an object instance and name. Elements are added in this hash table only if an application running on a local server performs a lookup operation. The cache communicator (CC) is registered as a message listener and performs the communication among the naming services in the different server nodes in the cluster. The CC is used to notify the cluster about the changes in cache, which concern global objects. If an unbind, rebind or rename operation is performed over a global object, the object will be removed from cache on the current server and a message with object name will be sent to all other servers to inform them of the invalid global object.

In one embodiment, JNDIMemoryImpl 512 is the implementation of the non-persistent naming data management within the naming service. JNDIMemoryImpl 512 keeps the hash tables of the containers stored by name and by ID and a handle to the root container object, which keeps hash tables of all the objects and sub contexts that can be found in the root context of the naming system stored by name and ID. All other containers have the same structure as the root container but are available for direct access. Thus the whole hierarchical tree like structure of objects and contexts in a naming system may be organized in hash tables with only two levels of nesting.

The following example of operation in one embodiment of the invention illustrates operations in response to local and global objects. For example, client performs a bind (String name, Object object) operation. First in ClientContext 508 the object parameter is wrapped in a directory object (DirObject) instance, serialized, if possible, and the byte array is sent to ServerContextImpl 510 where the type and correctness of the operation are evaluated.

In ServerContextImpl 510, if the operation involves a local object: the object is passed to a bind method of JNDIMemoryImpl 512. An object ID that is unique to the server is generated. The byte array representation of the object, the object ID, the type of the operation and the link ID identifying the container object linked to this object are wrapped in an Obj object and placed against the object name in the hash table instance of the container corresponding to the context in which the object has to be placed. In one embodiment, the link ID is the container ID (if the object represents a context) or –1 otherwise.

If the operation involves a global object, the object is still passed to the bind method of JNDIMemoryImpl 512, but the method generates an object ID of type long that is unique for the entire cluster. In one embodiment, this ID is generated from two integers—the server ID of the current server node and the consecutive number of the global bound object. The byte array representation of the object, the object ID, the type of the operation and the link ID form an Obj object, which is put against the object name in a hash table instance of a container corresponding to the context in which the object should be placed. Using the messaging service, (see FIG. 2), messages containing the ID, the name and the byte array representing the object, a byte parameter which shows whether the object is remote or not, and the name of the container in which the object should be placed are sent to all server nodes in the cluster. The name of the container is unique in the cluster and shows the full path name from the root context to the requested context. In one embodiment, the sender server does not wait to receive answers from the other server nodes whether the bind operation is performed successfully.

When a new server node is connected to the cluster it sends a message with a specific ID via the messaging service to an arbitrary server node with a request that information for all global objects and context to be sent to it. This message "arrives" in the CacheCommunicator instance of the receiver server and calls a method of JNDIMemoryImpl. Naming tree is recursively searched for global objects and contexts and if such are found they are sent as messages with all additional information to the server from which the request has been sent. The other server receives the messages and executes the operations locally. If the container in which the global object must be place does not exist, it is created and the object is put in it. If a part of the path of contexts from the root context to the context in which the object must be placed does not exist, all the missing intermediate contexts from the path are created. The names for the contexts are taken from the name of the container in which the object must be placed—it contains the whole path. In one embodiment, no responses are returned to the server, which sends the messages whether the replication is executed correctly or not.

Before every lookup operation, a check is made whether the looked up object is a global remote object, e.g. it is a global object created by a remote server node. If the object is a global remote object, the creating server is checked to insure the server remains in the cluster, e.g. has not shut down or crashed. If the creating server remains in the cluster, the object is returned as a result from the operation. Otherwise, the object is deleted from the hash table of the corresponding container and a message is sent to all other server nodes to delete the object from the hash table in their respective containers. If the object is not a global remote object, it is returned as a result from the operation.

Figure 6:
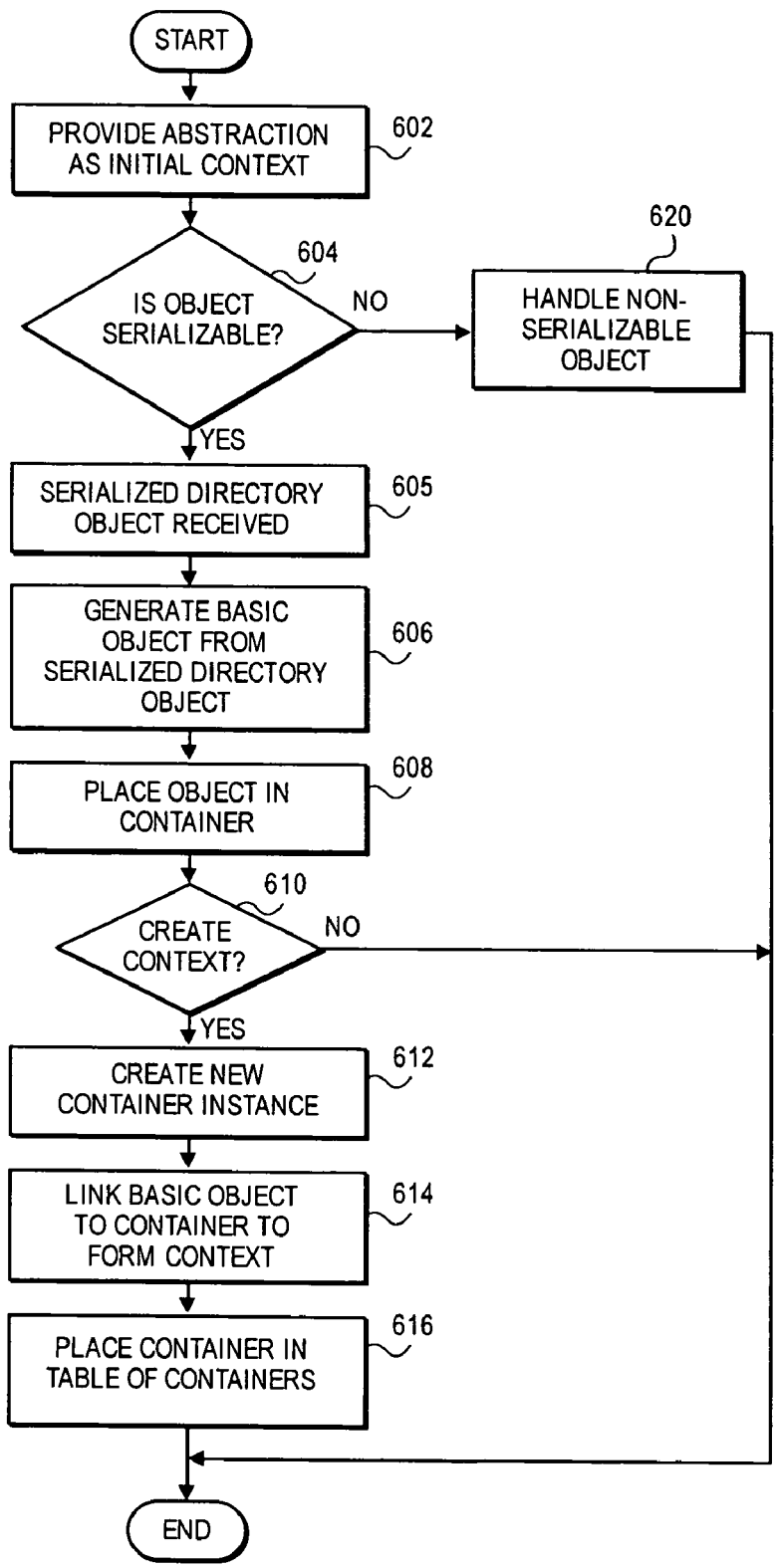
FIG. 6 is a flow diagram of operations in the naming service in one embodiment of the invention.

FIG. 6 is a flow diagram of operations in the naming service in one embodiment of the invention. At block 602, responsive to a request for initial context, naming service provides an abstraction as an initial context. In one embodiment, the root context is provided as the initial context.

At decision block 604, a determination is made if an object is serializable. If it is, at block 605 a serialized directory object is received from a client at the server side naming implementation. At block 606, the naming service generates a basic object from the serialized directory object. At block 608, the basic object is placed in a designated container within the naming hierarchy. This may take the form of placing the object in the hash table of the container objects. As previously noted, such hash table is retained in non-persistent storage. A determination is made at decision block 610 if the subcontext is to be created with the object. If so, at block 612, the naming service creates a new container instance. At block 614, the basic object is linked to the new container instance to form a context. At block 616, the Container of the context is stored in the table of containers in non-persistent memory. In one embodiment, this non-persistent storage may be a memory implementation of a Java virtual machine. If at decision block 610 no context was to be created, the routine ends. If at decision block 604 no serialized directory object is received (implying that the created object is non-serializable), naming system handles non-serializable object at block 620. In one embodiment of the invention permits non-serializable objects to be bound within the naming system, but requires all data for such objects to be maintained on the client side. In such embodiments, the non-serializable objects are only available to the client which has bound them and all the clients running on the same VM.

By virtue of the fact that this storage is non-persistent, in the event that a reboot of the system or the server occurs, objects and context stored in the non-persistent storage are guaranteed to be removed from the naming system. As a result, naming service rebuilds the naming hierarchy on reboot without concerns of conflict from any preexisting naming hierarchy.

Elements of embodiments may also be provided as a machine-readable medium for storing the machine-executable instructions. The machine-readable medium is an article of manufacture and may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
    an application server instance including a dispatcher node in communication with at least one application server node, wherein the application server node includes at least one core service;
    the application server instance including a plurality of virtual machines, wherein the dispatcher node is included within a first virtual machine of the plurality of virtual machines and the application server node is included within a second virtual machine of the plurality of virtual machines;
    a non-persistent storage unit representing a memory implementation of the second virtual machine included in the application server node; and
    a hierarchical memory representation of a hierarchical naming structure stored within the non-persistent storage unit, wherein the hierarchical memory representation includes a plurality of hash tables stored via two levels of nesting, wherein a first hash table from the plurality of hash tables storing a plurality of containers is stored as a first level in two levels of nesting, and wherein each container from the plurality of containers includes at least one hash table from the plurality of hash tables storing at least one object, wherein the at least one hash table is stored in the first hash table as a second level in the two levels of nesting.

2. The apparatus of claim 1 wherein the hierarchical memory representation of the hierarchical naming structure is removed from the non-persistent storage unit when the application server node is rebooted.

3. The apparatus of claim 1 wherein the hierarchical memory representation of the hierarchical naming structure comprises:
    a plurality of contexts each context including a basic object linked to a container from the plurality of containers.

4. The apparatus of claim 3 wherein the container comprises:
    a hash table of objects against names in the second level of the two levels of nesting.

5. The apparatus of claim 3 wherein the container comprises:
    a hash table of objects against identifiers in the second level of the two levels of nesting.

6. The apparatus of claim 3 wherein the basic object comprises:
    a name string;
    a byte array; and
    a link identifier.

7. The apparatus of claim 6 wherein the link identifier has a value equal to a container identifier of exactly one container in the hierarchical naming structure and wherein that link identifier is unique within the hierarchical naming structure.

8. A computing system comprising:
    a processor; and
    a memory, the memory comprising:
        a plurality of virtual machines (VM) each comprising an application server node;
        a non-persistent memory implementation of a VM within the application server node; and
        a naming service within the application server node, the naming service to store a hierarchical memory representation of a hierarchical naming structure in the non-persistent memory implementation of the VM, wherein the hierarchical memory representation includes a plurality of hash tables stored via two levels of nesting, wherein a first hash table from the plurality of hash tables storing a plurality of containers is stored as a first level in two levels of nesting, and wherein each container from the plurality of containers includes at least one hash table from the plurality of hash tables storing at least one object, wherein the at least one hash table is stored in the first hash table as a second level in the two levels of nesting.

9. The system of claim 8 wherein the naming service comprises:
    a naming cache, including a hash table of cached objects as a byte array and a name; and
    a hash table of cached objects as an object instance and a name.

10. The system of claim 9 wherein the naming cache further comprises:
    a cache communicator to provide communication between naming services running on different application server nodes of a cluster.

11. The system of claim 8 wherein a container from the plurality of containers comprises:
    a hash table of objects against names in the second level of the two levels of nesting; and
    a hash table of objects against identifiers in the second level of the two levels of nesting.

12. A method comprising:
    receiving a serialized directory object;
    generating a basic object from the serialized directory object;
    creating a context instance by linking the basic object to a container, wherein the container represents the context instance;
    storing the container in a hierarchical memory representation of a hierarchical naming structure stored within a non-persistent storage unit, wherein the hierarchical memory representation includes a plurality of hash tables stored via two levels of nesting, wherein a first hash table from the plurality of hash tables that stores the container is stored as a first level of nesting of two levels of nesting, and wherein the container includes at least one hash table from the plurality of hash tables; and storing objects bound in the context instance represented by the container in the at least one hash table nested in the first hash table as a next second level in the two levels of nesting.

13. The method of claim 12 further comprising:
storing the context instance in a memory implementation of a virtual machine; and
removing the context instance in response to a reboot of an application server resident in the virtual machine.

14. The method of claim 12 further comprising:
storing the objects against names in the next second level of nesting of the two levels of nesting; and
storing the objects against identifiers in the second level of nesting of the two levels of nesting.

15. An apparatus comprising:
means for hierarchically organizing a plurality of contexts in a hierarchical memory representation of a hierarchical naming structure, wherein the hierarchical memory representation includes a plurality of hash tables stored via two levels of nesting, wherein a first hash table from the plurality of hash tables storing a plurality of containers is stored as a first level in two levels of nesting, and wherein each container from the plurality of containers includes at least one hash table from the plurality of hash tables storing at least one object, wherein the at least one hash table is stored in the first hash table as a second level in the two levels of nesting; and
means for non-persistently storing the hierarchical memory representation as a plurality of hash tables stored via the two levels of nesting in a non-persistent storage unit.

16. The apparatus of claim 15 further comprising:
means for linking a first object type to a container object type to form a sub-context.

17. The apparatus of claim 16 wherein the means for linking insure that no more than one object of the first object type is linked to a single object of the container object type.

18. A non-transitory computer-readable medium containing instructions that, when executed, cause a machine to:
receive a serialized directory object;
generate a basic object from the serialized directory object;
create a context instance by linking the basic object to a container, wherein the container represents the context instance;
store the container in a hierarchical memory representation of a hierarchical naming structure, wherein the hierarchical memory representation includes a plurality of hash tables stored via two levels of nesting, wherein a first hash table from the plurality of hash tables that stores the container is stored as a first level of nesting of two levels of nesting, and wherein the container includes at least one hash table from the plurality of hash tables; and
store objects bound in the context instance represented by the container in the at least one hash table nested in the first hash table as a next second level in the two levels of nesting.

19. The computer-readable medium of claim 18 wherein the instructions further cause the machine to:
store the context instance in a memory implementation of a virtual machine; and
remove the context instance in response to a reboot of an application server resident in the virtual machine.

20. The computer-readable medium of claim 18 wherein the instructions further cause the machine to:
store the objects against names in the second level of nesting of the two levels of nesting; and
store the objects against identifiers in the second level of nesting of the two levels of nesting.

* * * * *